No. 742,109.

Patented October 20, 1903.

UNITED STATES PATENT OFFICE.

PAUL WÜRTZ, OF HOBOKEN, NEW JERSEY.

MOLDING MATERIAL.

SPECIFICATION forming part of Letters Patent No. 742,109, dated October 20, 1903.

Application filed June 26, 1902. Serial No. 113,370. (No specimens.)

*To all whom it may concern:*

Be it known that I, PAUL WÜRTZ, of Hoboken, county of Hudson, and State of New Jersey, have invented certain new and useful Improvements in Making Molds for Castings, of which the following is a full, clear, and exact description.

My invention relates to making molds for castings of metals; and it consists of the hereinafter-described composition of matter for and the art of making a hard non-shrinkable mold having an absolutely continuous smooth surface.

The material of which the mold is made is composed of the following ingredients: seven parts of Keene cement, two parts of pulverized asbestos, one-half of a part of infusorial earth, and one-half of a part of pulverized caput mortuum. The name "Keene cement" designates a particular branch of cement known in the building trade and which does possess, as I have found, the qualities required for the purposes of my invention. The ingredients are to be measured by volume—as, for instance, seven cubic feet of Keene cement, two cubic feet of pulverized asbestos, one-half cubic foot of infusorial earth, and one-half cubic foot of caput mortuum, which is red oxid of iron remaining from the distillation of sulfid of iron in the manufacture of fuming sulfuric acid.

In preparing the material I proceed as follows: First, the asbestos and the caput mortuum are mixed with water, each in a separate vessel, into a plastic mass and then together. The mixing must be done very thoroughly in respect to each of the two ingredients and also when these two ingredients are mixed together. The test whether each of the ingredients is sufficiently well mixed with water will be found if the whole mass of the mixture is of equal consistency and no dry lumps are found and no bubbles of air come to the surface when the mixing is stopped. The test whether both substances are sufficiently thoroughly mixed with each other will be found if the entire mass of the mixture appears to be of a uniform color. When these two ingredients are thoroughly mixed together, the infusorial earth is added thereto, (gradually,) the mixing being continued until all particles of the infusorial earth are thoroughly absorbed by the mixture. Next the cement is mixed with water, such quantity of water being added thereto as will be required to make a readily and easily flowing mass approximately of the consistency of pulp in paper-making. Then the cement is added to the other ingredients while the mixing is being continued. The resulting product is a viscid mass, but is sufficiently liquid to flow.

A mold for casting is produced of this material as follows: The pattern of the casting is placed into a wooden box in such position as is required for casting and is secured in this position in a suitable manner. The box may be divided by sheet-metal partitions into a number of parts as the configuration of the pattern may require. Then the material is poured into the box. The mold hardens rapidly, and when set the parts of the mold are carefully taken apart and left until thoroughly dry. Then the parts of the mold are placed in an oven arranged in a manner similar to an oven used for pottery and there gradually heated to a red heat.

The composition of matter made as hereinbefore described possesses the quality of penetrating into the most minute features of the pattern and retaining impressions of even the most delicate lines of a printing-plate or other engraving when solidified. These minute features are faithfully retained in the process of burning. The surfaces of the mold appear as if they had been chiseled. Polished surfaces of the pattern are reproduced in the mold distinct from matted surfaces, the former appearing as if glazed and the latter as if rubbed with some very finely pulverized grinding material. These distinctions are also reproduced in equally finished condition upon the casting. The material does not shrink after it is once set, the molds preserving accurately the dimensions of the pattern. No feature of the pattern is obliterated no matter how small or how finely executed.

The molds are suitable for castings of any kind of metal regardless of the degree of heat required for melting it. The patterns are so exactly reproduced in the casts that if, for instance, an engraved die or the printing-plate of an etching is used for a pattern the mold will reproduce every line, even the most delicate lines of shading on the castings.

After the molds are burned and cooled they are framed. The framing consists in setting the parts of the molds in wrought-iron boxes corresponding to the outer conformation of the mold. The parts of these boxes are so arranged as to close into each other hermetically and hold the parts of the mold together. An inlet and an outlet opening are provided in the boxes corresponding with those of the mold.

Patterns of wood, metal, or rubber may be used as the nature of the work to be reproduced may require. The casting is done with or without pneumatic pressure.

I claim as my invention—

1. A composition of matter for molds for castings containing the substance commercially designated as "Keene cement," asbestos, infusorial earth and caput mortuum.

2. The composition of matter for molds for castings containing, approximately, seven parts of the substance commercially designated as "Keene cement," two parts of pulverized asbestos, one-half of a part of infusorial earth and one-half of a part of caput mortuum, mixed together as herein set forth.

3. A mold for castings made of plastic composition prepared substantially as herein described, of seven parts of Keene cement, two parts of pulverized asbestos, one-half of a part of infusorial earth and one-half of a part of caput mortuum.

4. A mold for castings made of plastic composition prepared, substantially as herein described, of the substance commercially designated as "Keene cement," asbestos, infusorial earth and caput mortuum.

PAUL WÜRTZ.

Witnesses:
JOHN A. PAULSON,
M. A. HELMKE.